May 13, 1930. G. W. GILDERMAN 1,758,890
PROCESS FOR MAKING CORES
Original Filed June 4, 1927  5 Sheets-Sheet 3

Inventor
George W. Gilderman

May 13, 1930.  G. W. GILDERMAN  1,758,890
PROCESS FOR MAKING CORES
Original Filed June 4, 1927   5 Sheets-Sheet 4
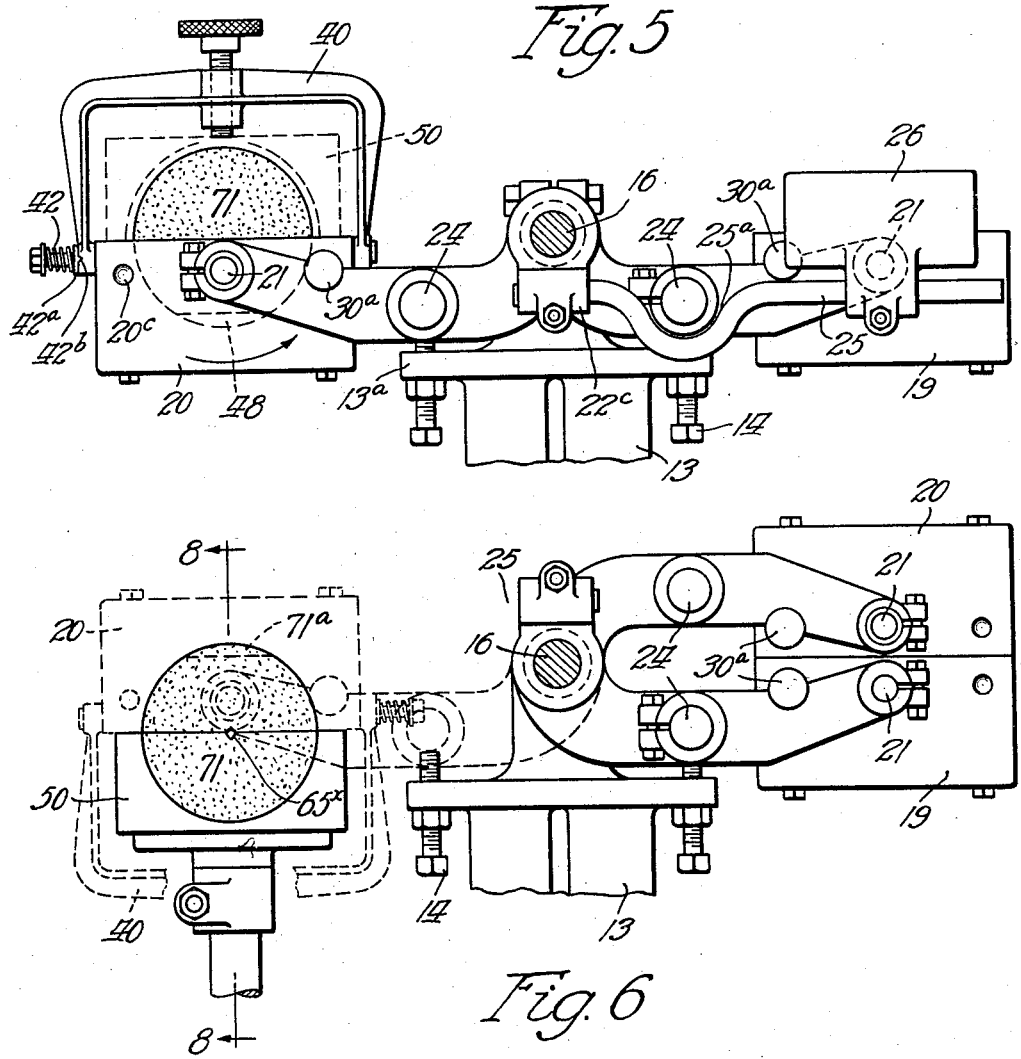
Inventor
George W. Gilderman
By Emery, Booth, Janney & Varney
Attys.

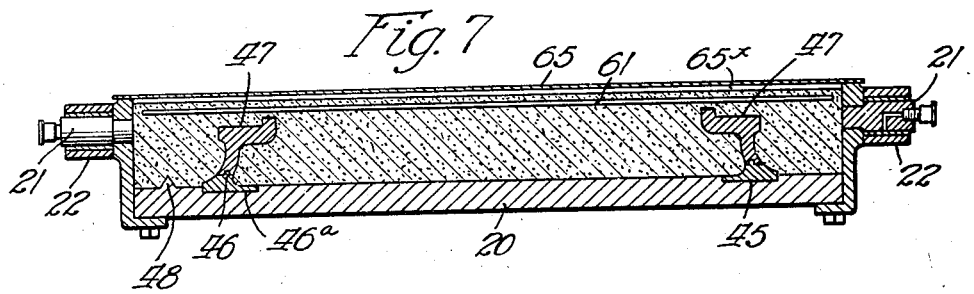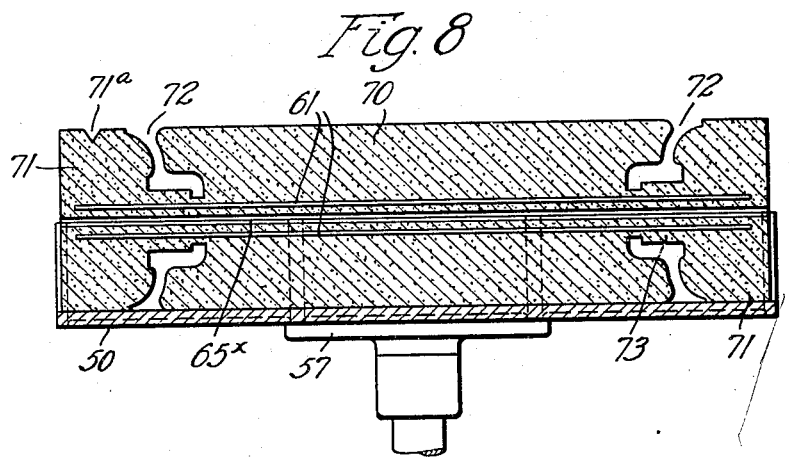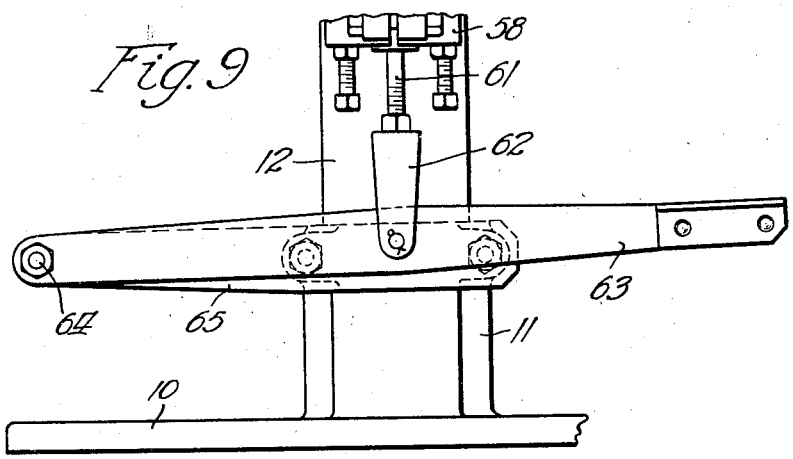

Patented May 13, 1930

1,758,890

UNITED STATES PATENT OFFICE

GEORGE W. GILDERMAN, OF MISHAWAKA, INDIANA, ASSIGNOR TO DODGE MANUFAC-
TURING CORPORATION, OF MISHAWAKA, INDIANA, A CORPORATION OF DELAWARE

PROCESS FOR MAKING CORES

Original application filed June 4, 1927, Serial No. 196,473. Divided and this application filed April 26,
1928. Serial No. 273,037.

This invention relates to core making. The invention provides a practicable and efficient method for producing improved cores for use in casting hollow rolls with integral end webs or heads, such cores being adapted for exteriorly molding the ends of as well as interiorly coring the castings, and by which method such cores may be readily made in forms suitable for hollow roll castings the end webs of which are formed with hub extensions or otherwise formed to provide dished or recessed roll ends. The invention further includes certain improvements in core making practice contributing to convenient, efficient economical production, especially in the case of production of cores of the special character indicated.

For a full understanding of the invention, I will describe an illustrative practice of a method embodying the features of the invention, in connection with an illustrative machine or apparatus providing one practicable means for carrying out the invention; which machine or apparatus is the subject matter of my application Serial No. 196,473, filed June 4, 1927, of which this application is a division. The core hereinafter described, being a product of the invention, is the subject matter of my application Serial No. 273,036, filed April 26, 1928, which is also a division of my said application Serial No. 196,473.

In the accompanying drawings,—

Fig. 5 is a view similar to Fig. 4 showing the boxes in supported position with the drier applied.

Fig. 6 is a view similar to Fig. 5 after deposit of the drier and core on the withdrawing table.

Fig. 7 is a vertical section through a half-core taken along the line 7—7 of Fig. 3.

Fig. 8 is a vertical section through the completed core taken along the line 8—8 of Fig. 6.

Fig. 9 is a side elevation of the withdrawing mechanism.

Figure 1:
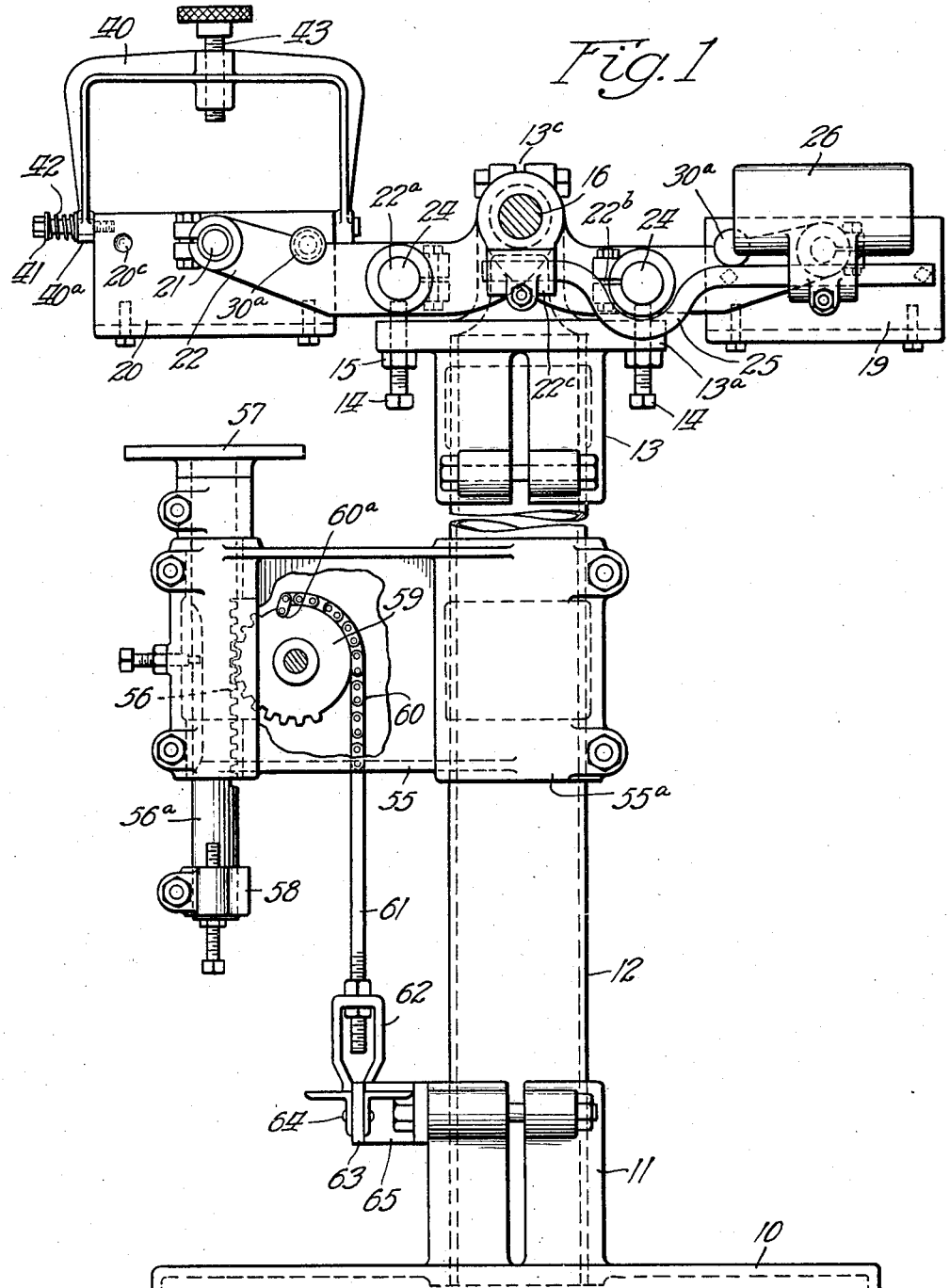
Fig. 1 is a side elevation of the illustrative machine, a portion thereof being broken away for illustration.

The accompanying drawings illustrate one form of apparatus particularly adapted for the carrying out of my process, like numerals referring to like elements throughout such drawings. In the drawings 10 indicates a base or platform having the split socket 11 in which is stepped or mounted the post 12, secured in proper position by the contraction of split socket 11.

On the upper end of the post or column 12 is the head 13, also split to permit clamping in adjusted position. This head 13 is provided with a table portion 13$^a$ through which extends a plurality of studs or bolts 14 secured in adjusted position by the lock nuts 15. Extending upwardly from the table portion is the shoulder 13$^b$, shown in Fig. 2, for example, the same being provided with a transverse central bore and split as indicated at 13$^c$. A fixed shaft 16 extends through the bore in the shoulder 13$^b$ and is secured in adjusted position by the contraction of the shoulder, as will be obvious.

Figure 2:
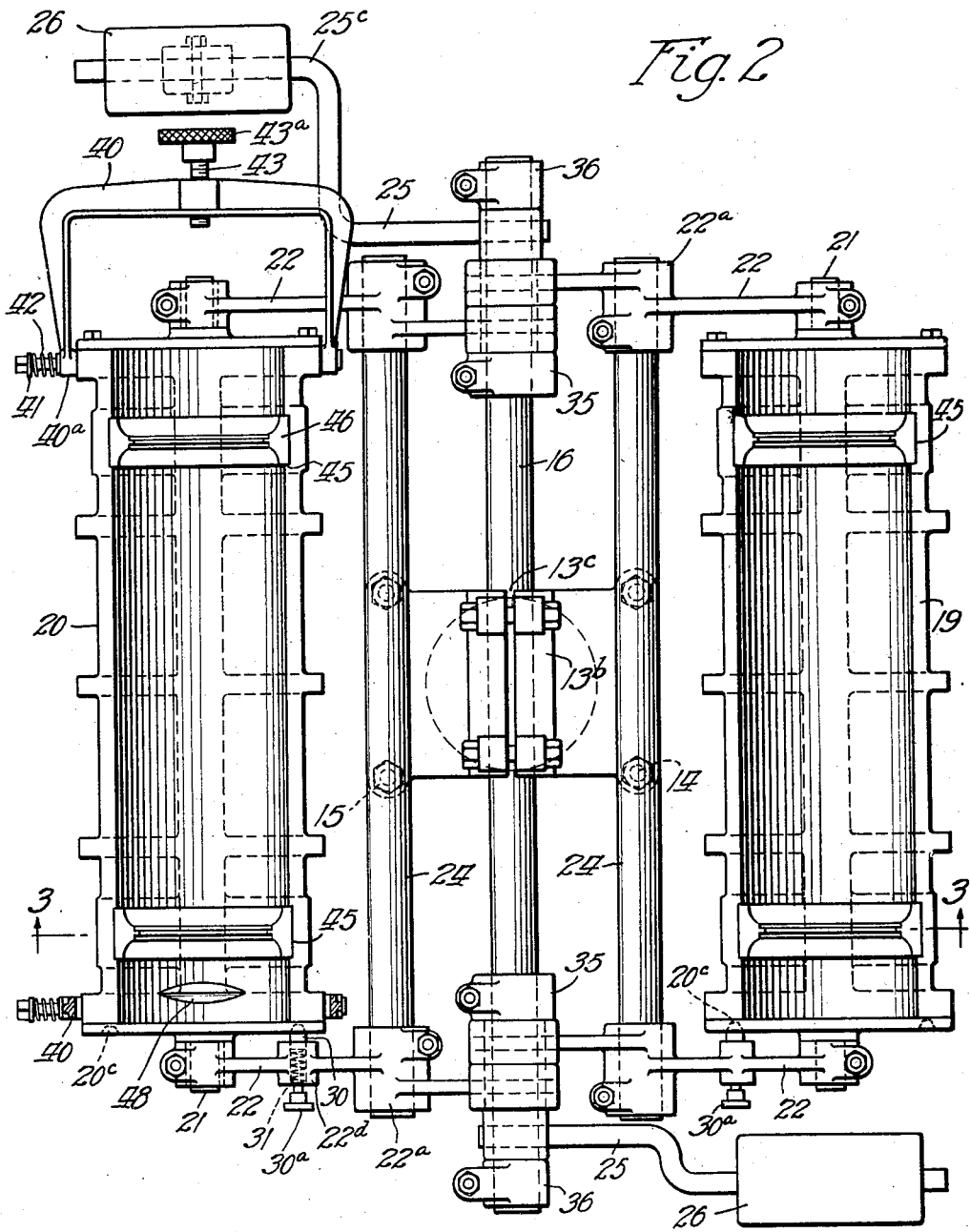
Fig. 2 is a plan view of the same showing the mold sections in spaced horizontal relation.

A pair of core boxes 19 and 20 are provided, generally similar in construction. Each of these boxes is provided with a trunnion 21 projecting from each end and these trunnions are journaled in the ends of arms 22, which are arranged with one pair for each of the core boxes 19 and 20, as illustrated in Fig. 2. A cross-shaft 24 extends between and through each pair of the arms, enlarged apertured portions 22$^a$ being provided for that purpose, the same being split as indicated in Fig. 1 at 22$^b$ for contraction to secure the shafts 24 in fixed, adjusted relation with respect to the arms.

Each of the arms is rotatably journaled at its inner ends upon fixed shaft 16 so that each pair of arms with its cross-shaft 24 may be rotated or swung as a unit about the shaft 16, carrying with it its box 19 or 20.

A lug or boss 22$^c$ is provided at the inner end of one of each pair of the arms 22 and this is apertured and split to receive and engage the end of the bar 25 which carries the adjustably mounted counter-weight 26, each bar 25 being curved to accommodate and clear the cross-shaft 24 and the enlarged portion $22^a$ of the arm 22 to permit removal or adjustment of the shaft 24, as will be apparent.

To lock the core boxes against rotation I provide on one of each pair of arms 22 a detent 30 extending through the arms, a suitable boss $22^d$ being provided for that purpose. A spring 31 mounted in the boss $22^d$ normally extends the locking end of the detent 30, which is provided with the engaging cap or head $30^a$ at its other end. At the end of each box adjacent the detent 30 is provided a pair of apertures or sockets $20^c$ in which the detent may seat, as indicated in Fig. 2. When the detent is withdrawn, the corresponding box may be freely rotated about its trunnion 21, as will be apparent, to discharge its content or for other purposes. The detent normally will engage one of the sockets $20^c$ to lock the box in molding or inverted position, as desired.

Split collars 35, 36 are provided at the inner and outer sides respectively of the inner ends of the arms 22 to secure the same in adjusted position on the shaft 16. This construction permits the accommodation of the same machine to different lengths of boxes, as will be apparent, the shaft 24 being adjustable with respect to the arms 22 also. It will be noted that one of the counter-balance rods 25 is horizontally offset as indicated at $25^c$ to permit swinging outwardly a bail hereinafter described.

The bolts or studs 14, it will be noted, underlie cross-shafts 24 and may be adjusted to support the shafts and thereby the arms 22 in horizontal position for molding and subsequent operations in such wise that the boxes will be properly leveled.

The core box 20 is provided with bails 40, one pivoted at each of its ends to the box as indicated at $40^a$ upon suitable trunnions. One of the trunnions 41 is extended beyond the end of the bail 40 and a spring 42 is mounted under compression on such extended trunnion. A washer $42^a$ is pressed against the end of the bail as indicated in Fig. 5, the washer being provided with a V-shaped lug $42^b$ to engage either of a pair of recesses or notches in the end of the bail, this arrangement providing a yielding securing means to hold the bail in either upright or horizontal position. A lock screw 43 is threaded through the center of the bail 40, being provided with the knurled head $43^a$ for manual operation.

Due to the offsetting of one of the bars 25, the bail 40 adjacent thereto may be swung outwardly a sufficient distance, as will be apparent.

Figure 3:
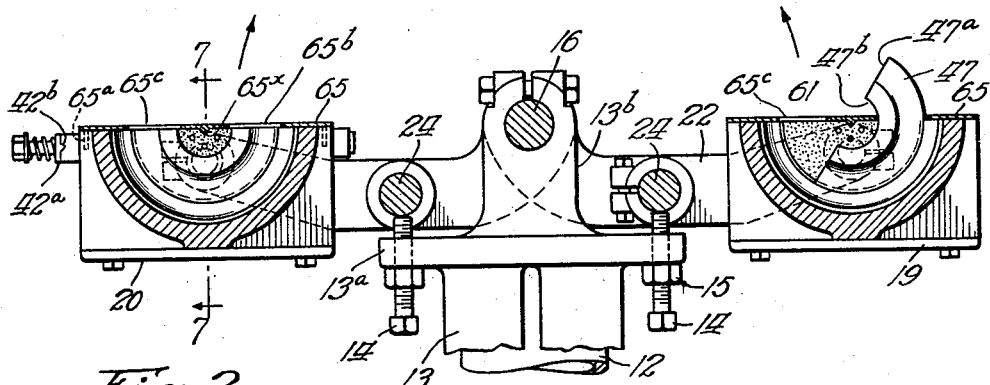
Fig. 3 is a vertical section along the line 3—3 of Fig. 2.

Each core box is provided with a pair of spaced grooves 45 in its inner wall. In each of such grooves is fixedly mounted an annular half-ring 46 (see Figs. 2 and 7) of relatively broad base and curvedly tapering to a shoulder or tongue $46^a$. A rotatable template member 47 is grooved in its outer periphery to engage with the tongue $46^a$. This template member 47 is of semi-circular form, being slightly tapered from the end $47^a$ to the other end for draft. The member 47 will rotate upon the fixed portion 46 as indicated in Fig. 3. A V-shaped rib 48 extends partially across the bottom of the core box 20 to form a similar notch in the completed core for a purpose described hereinafter.

The sectional contour of the template member is illustrated in Fig. 7. As shown in Fig. 3, the ring-like form of the template member provides the central recess $47^b$ for a purpose hereinafter described.

For support of and carrying the completed core, I provide a core holder or drier 50 of light metal or the like preferably of relatively high heat conductivity, this member being concaved to support and protect substantially half the periphery of the completed core.

A withdrawing table 57 is provided for support and removal of the completed core and its drier 50, this being supported from a casing or beam 55, having a split recessed end $55^a$ engaging the post 12 to which it may be clamped in suitable adjusted position. At its other end, the casing or beam 55 is vertically recessed to accommodate the reciprocating plunger 56, carrying the table 57 at its upper end. At its lower end the plunger 56 carries a collar 58, which will function as a stop member to limit the amount of reciprocation.

Journaled in the casing 55 is a pinion 59 in mesh with the rack portion $56^a$ of the plunger 56 as illustrated in dotted lines in Fig. 1. A chain 60 partially surrounds the pinion 59 meshing with the teeth thereof, being secured at its end $60^a$ to the pinion. Attached to the lower end of the chain 60 and extending downwardly therefrom is the rod 61 engaging the clevis 62. This clevis is pivoted to the operating lever 63 which in turn is pivoted by the rivet or the like 64 to the bracket 65 attached to and projecting outwardly from the socket 11 (see Fig. 1). The lever 63 is provided with a pedal or the like at its free end on which the operator may step to lift the table 57, as will be obvious.

In the practice of my process and in the operation of the apparatus described above, the core boxes 19 and 20 are arranged in the position shown in Fig. 2, with the template members 47 in position. A parting substance is sprinkled over the interior of the boxes to ensure non-sticking of the core mixture or the like. The mixture or composition of which the core is to be constructed is then charged in the boxes, it being possible for two operators to work simultaneously on the two sections. This mold composition is solidly tamped in conventional manner. Tying or reinforcing rods 61 or the like are imbedded in the upper portion of each core section, as illustrated in Figs. 3 and 7, the recesses 47$^b$ permitting their accommodation together with the core composition. By reference to Fig. 8, it will be seen that I contemplate making a core with end extensions joined to the main bodies of the core by central coring portions and providing molding surfaces in fixed spaced relation to the ends of the main body for exteriorly molding the end webs of a hollow roll to be cast on the core, which extensions may serve for centering and supporting the core in the mold. As above indicated, in carrying out the invention I mold complemental longitudinal sections or half parts of the intended core in suitable core boxes, and in the molding process I employ in the boxes semi-circular forms or partitions corresponding in cross sectional configuration and in arrangement and position to the integral end webs of the intended casting, and which will form correspondingly shaped and arranged semi-annular spaces in the core sections; which partitions or portions thereof corresponding to the central portions of the roll webs comprise segmental templates seated in the boxes so as to be capable of rotation about the core axis. The templates may be of any desired cross sectional shape according to the intended configuration of the roll webs. For example the templates 47 employed in the illustrative practice shown in the drawings are of angular form, presenting horizontal extensions from curved portions, for molding the form of core recesses shown in Fig. 8.

After the core sections have been molded in the core boxes around the embedded templates, or around the said embedded partitions of which the templates constitute the inner parts, the templates are removed by rotating them about the core axis, thus permitting the subsequent release of the boxes from the core. The removal of the templates may be accomplished, for example, by applying suitably apertured stripper plates over the upper sides of the boxes, the apertures in the stripper plates registering with the ends of the templates, and then rotating the templates by pushing on one end with a suitable drift or tool inserted through one of the stripper plate openings, so that the templates will move out through the other openings. Such stripper plates are indicated in the drawings at 65, being properly positioned by means of pins 65$^a$ projecting into suitable holes in the boxes.

Each of these stripper plates is provided with a rib 65$^x$ on its under surface, these ribs being so located as to create or form a longitudinal vent aperture in the central upper surface of the core section.

Figure 4:
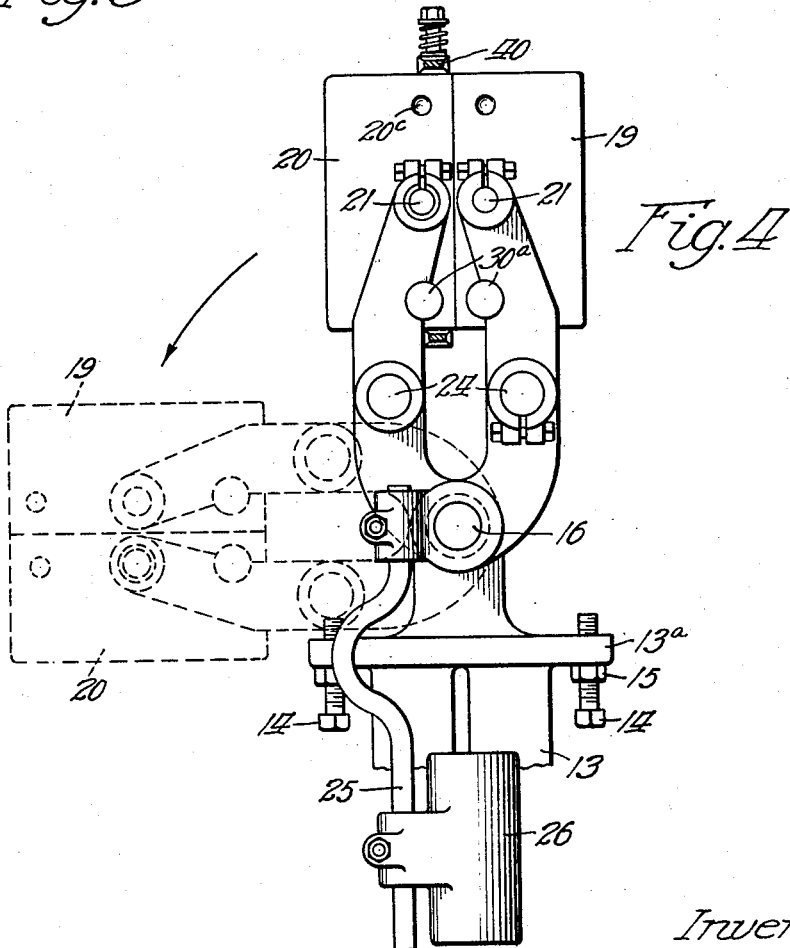
Fig. 4 is a side elevation of the mechanism showing the core boxes in central meeting position in full lines and swung in meeting position to one side in dotted lines.

These stripper plates are provided with a pair of apertures in registration with the ends of the templates 47, one aperture 65$^b$ being of a contour conforming to the section of the template 47. The other aperture 65$^c$ of each pair is of lesser area so that the template may not pass therethrough. With this construction the operator must start the template out of the core section in such wise that the large end will pass out first, and the tapered construction of the template will ensure proper draft or passage of the template. After the core sections have been struck off or leveled and the stripper plates 65 positioned, the operators may tap or strike the ends 47$^a$ of the templates to bring them into proper position against the stripper plates. Thereafter by inserting a drift or tool through the apertures 65$^c$ the templates 47 may be rotated out through the apertures 65$^b$, as indicated in Fig. 3, and removed from the boxes, after which the stripper plates 65 are removed and core paste or the like sprinkled over the tops of the core sections. I find that this paste may be applied in powdered form, and it will absorb enough moisture from the core mixture to form the proper adhesive. The application of the adhesive material in powdered form, sprinkling it over the surfaces to be joined, lessens the risk of disturbing the sand or sandy mixture comprising the core sections, while also avoiding the necessity of mixing a wet paste and applying it with a brush or otherwise. Thereafter each pair of arms 22 is swung upwardly about cross-shaft 16, the boxes being brought into contact with the meeting surfaces of the core sections substantially in a vertical plane. The two boxes having been brought into the position indicated in Fig. 4, the core paste will ensure ultimate adhesion of the core sections, and the two boxes are then swung together into the position indicated in dotted lines in Fig. 4. The upper box 19 is swung back to the position indicated in Fig. 5, and the core drier or holder 50 is substituted as indicated in Fig. 5. The bails 40 are then swung up over the drier 50, and the same is clamped to the lower core box 20 by the screws 43. The detent 30$^a$ is withdrawn and the box 20 and drier are inverted into the position shown in Fig. 6 (the core box there being indicated in dotted lines).

The operator depresses his end of the lever 63 which acts through the chain 60, pinion 59 and rack 56 to raise the table 57 to contact with the core drier 50. After the table 57 is in contact with and supporting the core holder or drier 50, the bails 40 should be released and swung to one side to free said holder from the box 20. The table 57 may then be gently lowered and the operator can remove the core drier and completed core to the drying or baking stand for final treatment. The box 20 may then be reinverted or turned right side up and with its arms may be then swung back to the full line position indicated in Fig. 6, the bails 40 having been released and swung to one side.

I obtain very satisfactory results by allowing the cores to stand in the driers in the open air for a period of time, as for example, twenty to thirty minutes, during which the surface portions are partially air-dried to form a shell which is relatively harder than the interior of the core. The relative hardening of the core surfaces by this preliminary air drying will resist the falling away of any portion of the unsupported walls of the core recesses. After the formation of this outer shell by air drying, the drier and core are moved into a baking oven or the like for the baking operation which completes the drying and baking of the core. Due to the harder shell formed by air drying, any stresses resulting from the baking of the inner portion of the core will be resisted and a more accurate and true core will result than where the core is immediately transferred to the oven from the molding operation.

By making the core in the manner described I am enabled to produce a core especially desirable for the casting of hollow rollers or rolls, in which an accurate cylindrical surface will be obtained, especially suitable for the construction of balanced rolls. I am also enabled to produce a core of this character in which adequate support will be provided for the core during the casting operation and which will be of sufficient strength and rigidity to resist destruction during casting. I am also enabled to produce a core which will permit the production of a cast roll or roller having concaved or recessed ends, especially desirable in certain cases, as for use in centering the roll or roller in the subsequent machining operations thereon.

In Fig. 8, I have illustrated in section a completed core which it will be apparent consists of a central cylindrical body portion 70 with spaced end portions 71, these being partially spaced by the recesses 72 and connected by the central hub portion 73. The extended end portions 71 in coaction with the mold in which the core is used, provide a large, desirable suport for the body portion of the core, which is spaced from the surrounding mold, and permit the accurate registry or positioning of the core in the mold.

The hub sections accommodate the tying or reinforcing rods 61, which further strengthens the core construction. This construction also permits the carrying of the recesses 72 under the ends of the body portion 70 a substantial distance, as indicated in Fig. 8, which is especially desirable with the core or roll which I desire to cast. The rib 48 of the core box 20 forms a notch $71^a$ in one end of the core with which coacts a lug or positioning means in the mold to accurately and properly position the core in the mold for casting.

It should be noted that my process permits the production of a core of the character described above, in which the inner ends of the end portions 71 are formed or shaped to coact with the adjacent ends of the body portion 70, so as to define the ends of a roll or roller cast for the use of my core in a suitable mold. This coaction between the end portions and the body portion of the core insures an accurate and unvarying construction of the resultant cast member, particularly at the ends thereof, independently of coaction with a mold, i. e. it is the coaction between the ends of the body portion and the end portions of the core which defines and establishes the ends of the cast roll, not the coaction between the core and the mold in which it is positioned.

What I claim is:

1. A process of core formation consisting in separately forming portions of the core in boxes, employing segmental templates in said boxes and embedding the same in the core material charged in said boxes, thereafter applying stripper plates to said boxes, then removing said templates through said stripper plates by rotating them, then applying an adhesive to the exposed surfaces after removal of said stripper plates, then moving said boxes into assembled relation to join said core portions, thereafter removing the completed core from said boxes.

2. A process of core formation consisting in charging separate boxes with core mixture to form portions of said core, including rotatable templates in each of said boxes, thereafter rotating said templates out of said boxes, and bringing said boxes together to join said core portions, thereafter removing the completed core from said boxes.

3. The method of making a core for use in casting a hollow roll with dished or recessed heads and having annular recesses of the configuration of said heads, which is characterized by molding the longitudinal half parts of the core in boxes while molding the said recesses therein by segmental molding members embedded in the core material, removing the said members by rotation about the core axis, bringing the boxes face to face and joining the core halves, and removing the core from the boxes.

In testimony whereof, I have signed my name to this specification.

GEORGE W. GILDERMAN.